(12) United States Patent
Hasegawa (10) Patent No.: US 7,434,397 B2
(45) Date of Patent: Oct. 14, 2008

(54) CONTROL APPARATUS FOR INTERNAL COMBUSTION ENGINE AND CONTROL METHOD FOR THE SAME

(75) Inventor: Jun Hasegawa, Chiryu (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 187 days.

(21) Appl. No.: 11/377,212

(22) Filed: Mar. 17, 2006

(65) Prior Publication Data
US 2006/0213194 A1 Sep. 28, 2006

(30) Foreign Application Priority Data
Mar. 28, 2005 (JP) .............................. 2005-091308

(51) Int. Cl.
F02B 33/44 (2006.01)
F02D 41/00 (2006.01)

(52) U.S. Cl. .................................................... 60/602

(58) Field of Classification Search ........... 60/600–603; 123/564; 244/221, 234
See application file for complete search history.

(56) References Cited

U.S. PATENT DOCUMENTS

| 4,463,565 | A | * | 8/1984 | Rydquist et al. ............... | 60/602 |
| 4,516,401 | A | * | 5/1985 | Jackson ........................ | 60/602 |
| 4,597,264 | A | * | 7/1986 | Cipolla ........................ | 60/602 |
| 4,982,567 | A | * | 1/1991 | Hashimoto et al. ........... | 60/600 |
| 5,083,434 | A | * | 1/1992 | Dahlgren et al. .............. | 60/602 |
| 5,442,918 | A | * | 8/1995 | Baeuerle et al. ............... | 60/602 |
| 5,442,920 | A | * | 8/1995 | Kamel et al. .................. | 60/602 |
| 5,502,966 | A | * | 4/1996 | Unland et al. ................. | 60/603 |
| 5,551,235 | A | * | 9/1996 | Entenmann et al. ........... | 60/602 |
| 5,600,956 | A | * | 2/1997 | Nytomt ........................ | 60/602 |
| 5,791,145 | A | * | 8/1998 | Freen ........................... | 60/603 |
| 5,829,254 | A | * | 11/1998 | Hayashi et al. ............... | 60/602 |
| 5,850,738 | A | * | 12/1998 | Hayashi ........................ | 60/602 |
| 5,899,069 | A | * | 5/1999 | Watanabe ..................... | 60/602 |

(Continued)

FOREIGN PATENT DOCUMENTS

DE 3106579 A1 * 9/1982

(Continued)

OTHER PUBLICATIONS

Korean Examination Report (with English translation) dated Feb. 16, 2007.

(Continued)

Primary Examiner—Thai-Ba Trieu
(74) Attorney, Agent, or Firm—Nixon & Vanderhye PC (57) ABSTRACT

An engine includes a throttle valve provided to an intake passage and a turbocharger, which includes an exhaust turbine and an intake compressor. The intake compressor is arranged in the intake passage. A waste gate valve operated using an electric actuator is provided to a bypass passage, which bypasses the exhaust turbine. A control apparatus for the engine includes a setting unit and a control unit. The setting unit sets the position of the waste gate valve at a target position in a normal operating condition of the engine. The target position is out of a position range, in which the waste gate valve is in a substantially full close position. The control unit controls the position of the waste gate valve such that the position of the waste gate valve coincides with the target position.

22 Claims, 8 Drawing Sheets

U.S. PATENT DOCUMENTS

| | | | |
|---|---|---|---|
| 5,913,301 A * | 6/1999 | Kienle et al. | 60/603 |
| 6,076,352 A * | 6/2000 | Hayashi | 60/602 |
| 6,192,867 B1 * | 2/2001 | Fenchel et al. | 60/603 |
| 6,224,021 B1 * | 5/2001 | Tanaka | 244/221 |
| 6,244,050 B1 * | 6/2001 | Aschner et al. | 60/602 |
| 6,918,250 B2 * | 7/2005 | Baeuerle | 60/602 |
| 6,928,819 B2 * | 8/2005 | Baeuerle et al. | 60/602 |
| 2002/0078934 A1 | 6/2002 | Hohkita et al. | 60/602 |
| 2005/0056012 A1 * | 3/2005 | Wild et al. | 60/602 |
| 2006/0207526 A1 * | 9/2006 | Kassner | 123/1 R |
| 2007/0022752 A1 * | 2/2007 | Carbonne et al. | 60/600 |
| 2007/0251233 A1 * | 11/2007 | Bardoll et al. | 60/602 |
| 2008/0059043 A1 * | 3/2008 | Ehlers et al. | 60/602 |

FOREIGN PATENT DOCUMENTS

| | | |
|---|---|---|
| JP | 7-332097 | 12/1995 |
| WO | WO 2004099594 A1 * | 11/2004 |

OTHER PUBLICATIONS

CN 2006100716271 counterpart CN application, first office action dated Nov. 30, 2007.

* cited by examiner

PMTG

FIG. 6B

BASE WGV POSITION

CONTROL APPARATUS FOR INTERNAL COMBUSTION ENGINE AND CONTROL METHOD FOR THE SAME

CROSS REFERENCE TO RELATED APPLICATIONS

This application is based on and incorporates herein by reference Japanese Patent Application No. 2005-91308 filed on Mar. 28, 2005.

FIELD OF THE INVENTION

The present invention relates to a control apparatus for an internal combustion engine having a turbocharger, and relates to a control method for the internal combustion engine.

BACKGROUND OF THE INVENTION

Conventionally, a charging device such as a turbocharger is applied to an internal combustion engine for enhancing efficiency of intake air, thereby increasing engine power. According to JP-A-7-332097, a charging control apparatus is provided to an engine for controlling a charging device. A bypass passage is provided to bypass an exhaust turbine provided to an exhaust pipe. A waste gate valve is provided to the bypass passage for controlling an amount of exhaust gas flowing into an exhaust turbine, thereby controlling charging pressure.

In general, a waste gate valve is controlled using a positive pressure actuator. A structure of the waste gate valve is described in reference to FIG. 10. A turbocharger 80 includes an intake compressor 81 and an exhaust turbine 82. The intake compressor 81 is provided to an intake pipe 85. The exhaust turbine 82 is provided to an exhaust pipe 86. The exhaust pipe 86 connects with a bypass passage 87 that bypasses the exhaust turbine 82. A waste gate valve (WGV) 88 is provided to the bypass passage 87.

Figure 10:
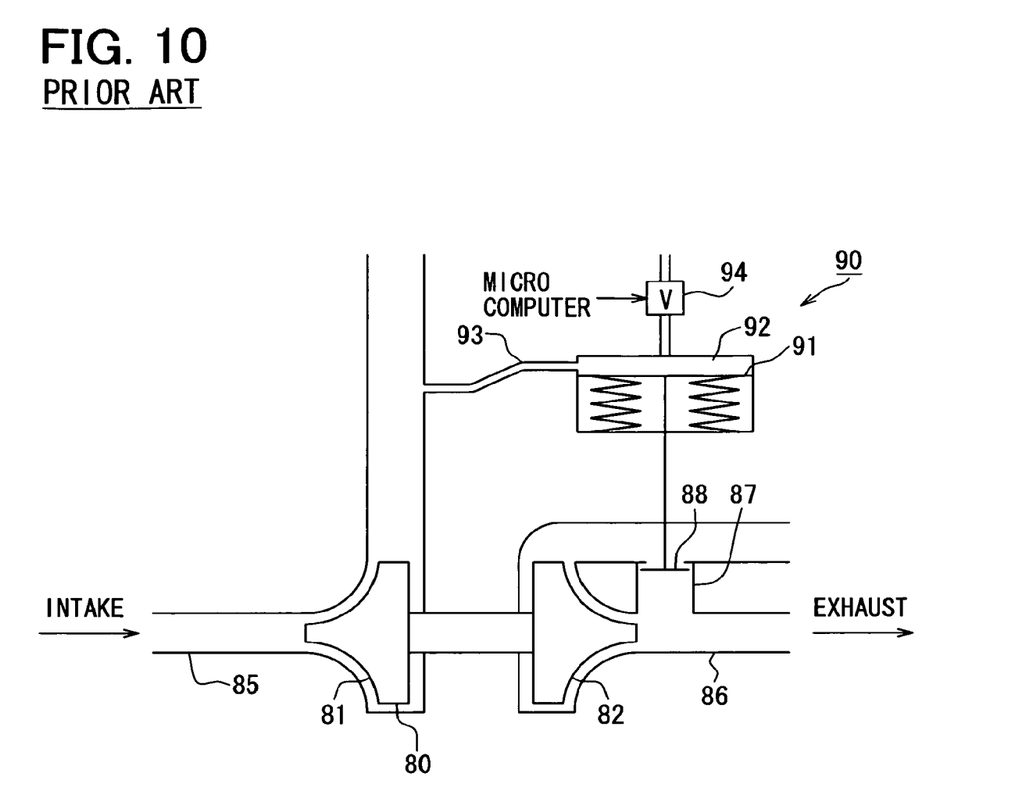
FIG. 10 is a schematic diagram showing an example of a structure of a positive pressure actuator.

The WGV 88 connects with an actuator 90 that has a pressure chamber 92 partitioned with a diaphragm 91. The WGV 88 is operated in accordance with pressure in the pressure chamber 92. Intake pressure (charging pressure) downstream of the intake compressor 81 is applied to the pressure chamber 92 through a pipe 93. A pressure control valve (vacuum switching valve) 94 is operated using a microprocessor or the like, so that pressure applied to the pressure chamber 92 is controlled.

When the pressure control valve 94 is closed, charging pressure is directly applied to the pressure chamber 92, so that the WGV 88 is operated in accordance with the charging pressure. Specifically, as charging pressure becomes high, pressure in the pressure chamber 92 becomes high. In this condition, the WGV 88 is operated on the opening side thereof, so that motivity of the exhaust turbine 82 decreases. Thus, motivity of the intake compressor 81 also decreases, so that charging pressure decreases. By contrast, as the pressure control valve 94 opens, pressure applied to the pressure chamber 92 decreases. Therefore, pressure in the pressure chamber 92 does not increase even when charging pressure becomes high, so that the WGV is maintained in a close position. Thus, the motivity of the turbine is maintained even when charging pressure increases. As a result, charging pressure is maintained, or is increased.

However, in this conventional structure, in general, when charging pressure increases, the WGV 88 is opened, so that charging pressure is restricted from excessively increasing. Specifically, the WGV 88 is maintained in the close position in a normal condition, and the WGV 88 slightly opens in one of a high load condition and a high rotation speed range. In this condition, the position of the WGV 88 is restricted in dependence upon the charging pressure. Accordingly, fuel efficiency cannot be sufficiently enhanced in a supercharging operation using a turbocharger.

SUMMARY OF THE INVENTION

In view of the foregoing and other problems, it is an object of the present invention to produce a control apparatus for an internal combustion engine having a turbocharger, the control apparatus being capable of controlling charging pressure and enhancing fuel efficiency. It is another object of the present invention to produce a control method for the internal combustion engine.

According to one aspect of the present invention, an internal combustion engine includes a throttle valve, a turbocharger, a waste gate valve, and an electric actuator. The throttle valve is provided to an intake passage. The throttle valve is adapted to controlling an amount of intake air. The turbocharger includes an exhaust turbine and an intake compressor. The intake compressor is arranged in the intake passage. The waste gate valve is provided to a bypass passage, which bypasses the exhaust turbine. The waste gate valve is adapted to controlling an opening area of the bypass passage. The electric actuator is adapted to operating the waste gate valve. Torque of the internal combustion engine is controlled at target torque by controlling a position of the throttle valve. The control apparatus includes a setting unit and a control unit. The setting unit is adapted to setting a target position of the waste gate valve in a normal operating condition of the internal combustion engine. The target position is out of a position range, in which the waste gate valve is in a substantially full close position. The control unit controls the waste gate valve such that a position of the waste gate valve coincides with the target position.

A method for controlling an internal combustion engine includes the following steps. Intake air flowing into the internal combustion engine is supercharged using an intake compressor of a turbocharger. Target position of a waste gate valve is set to be out of a position range, in which the waste gate valve is in a substantially full close position. An electric actuator is operated to control the position of the waste gate valve at the target position in a normal operating condition of the internal combustion engine, thereby controlling an amount of exhaust gas bypassing an exhaust turbine of the turbocharger.

Thus, the position of the waste gate valve is electrically controlled, regardless of the charging pressure, so that exhaust pressure decreases, thereby reducing a pumping loss.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

Embodiment

Figure 1:
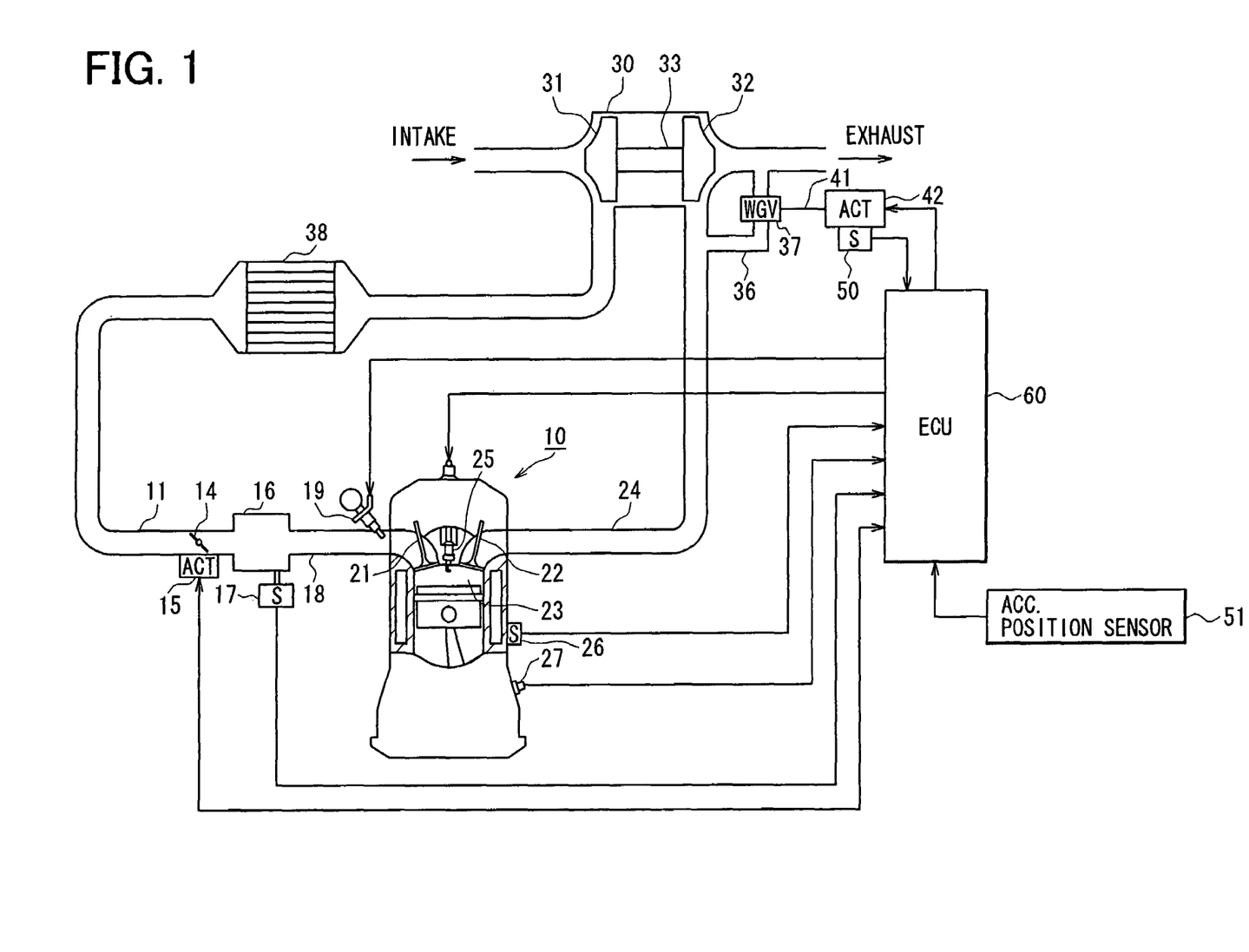
FIG. 1 is a schematic diagram showing a control system for an internal combustion engine, according to an embodiment of the present invention.

An internal combustion engine 10 shown in FIG. 1 has multiple cylinders. This multi cylinder engine 10 has an intake pipe (intake passage) 11 that accommodates a throttle valve 14 controlled using a throttle actuator 15 such as a DC motor. The throttle valve 14 serves as an intake amount control unit. The throttle actuator 15 has a throttle position sensor that detects an opening angle (throttle position) of the throttle valve 14. A surge tank 16 is provided to the downstream of the throttle valve 14. The surge tank 16 is provided with an intake pressure sensor 17 that detects intake pressure downstream of the throttle valve 14. The surge tank 16 is connected with an intake manifold 18, through which intake air is distributed into respective cylinders of the engine 10. Fuel injection valves 19 are provided to the intake manifold 18. Each of the fuel injection valves 19 is arranged in the vicinity of each intake port of each cylinder. The fuel injection valve 19 has an actuator such as a solenoid actuator for injecting fuel. Each of the intake ports of the engine 10 has an intake valve 21, and each of the exhaust ports of the engine 10 has an exhaust valve 22. The intake valve 21 opens, so that mixture gas, which is formed of air and fuel, is introduced into a combustion chamber 23. The exhaust valve 22 opens, so that exhaust gas, which is formed by burning the mixture gas, is exhausted into an exhaust pipe 24. The engine 10 has a cylinder head, to which an ignition plug 25 is provided to respective cylinder. The ignition plug 25 is applied with high voltage at a predetermined ignition timing via an ignition apparatus (not shown) such as ignition coil. The ignition plug 25 has opposing electrodes that generate spark therebetween by applying high voltage, thereby igniting mixture gas in the combustion chamber 23. The cylinder block of the engine 10 is provided with a water temperature sensor 26 and a crank angle sensor 27. The water temperature sensor 26 detects temperature of cooling water of the engine 10. The crank angle sensor 27 outputs a rectangular crank angle signal at every crank angle such as 30° CA, as the driveshaft of the engine 10 rotates.

A turbocharger (charging unit) 30 is provided between the intake pipe 11 and the exhaust pipe 24. The turbocharger 30 includes a compressor impeller (intake compressor) 31 and a turbine wheel (exhaust turbine) 32. The compressor impeller 31 is arranged in the intake pipe 11. The turbine wheel 32 is arranged in the exhaust pipe 24. The compressor impeller 31 connects with the turbine wheel 32 via a rotation shaft 33. A bypass passage 36 is provided between the upstream of the exhaust pipe 24 with respect to the turbine wheel 32 and the downstream of the exhaust pipe 24 with respect to the turbine wheel 32. The bypass passage 36 is provided with a waste gate valve (WGV) 37.

The WGV 37 connects with a WGV actuator (electric actuator) 42 that includes a motor such as an electric motor. The WGV actuator 42 operates, so that the WGV 37 changes an opening area of the bypass passage 36, thereby controlling an amount of exhaust gas flowing through the bypass passage 36. The WGV 37 serves as a charging condition variable unit, which controls charging pressure.

Figure 2:
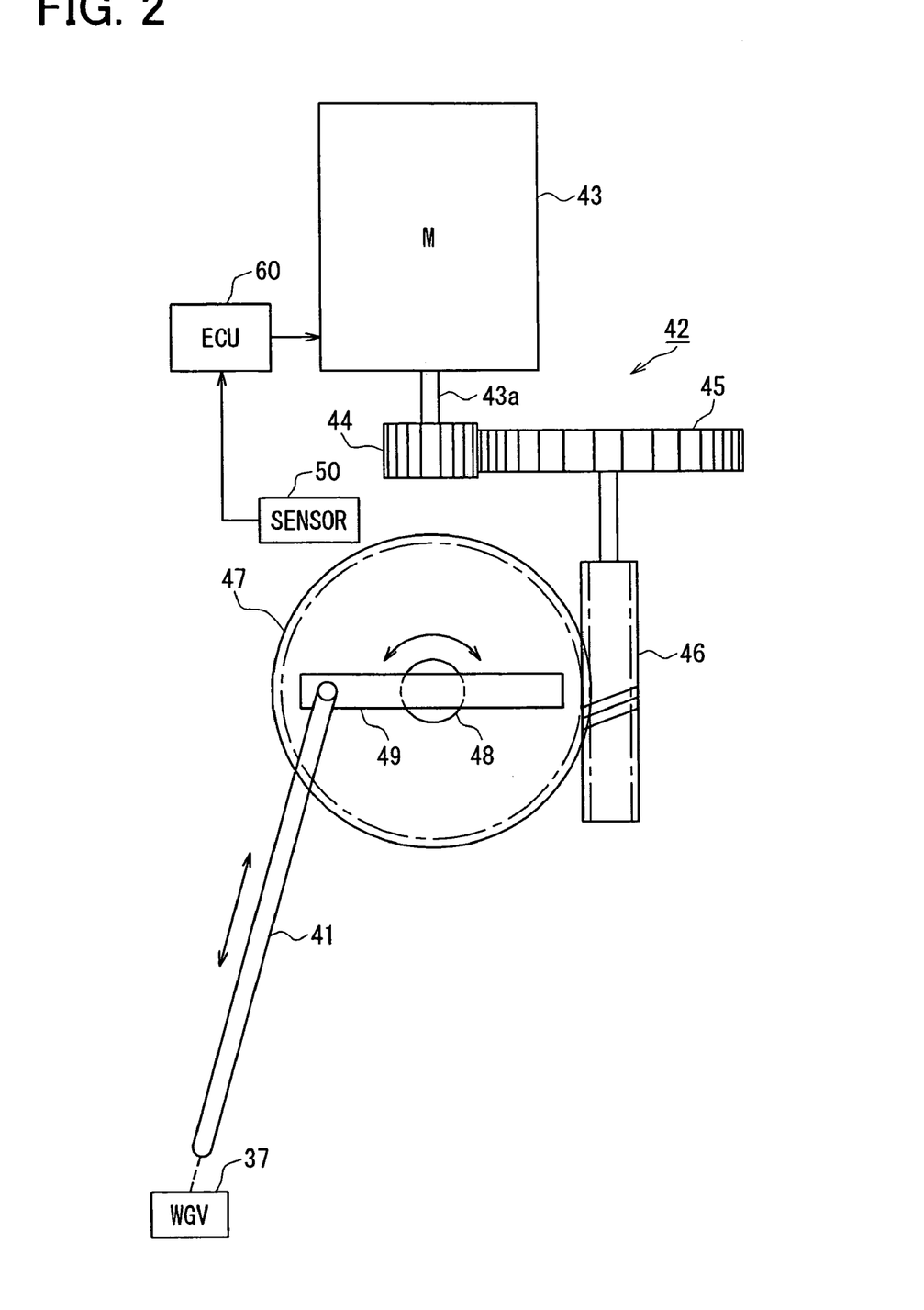
FIG. 2 is a schematic view showing a structure of a WGV actuator for the control system, according to the embodiment.

As shown in FIG. 2, the WGV actuator 42 has a case (not shown), which is provided with a motor 43. The motor 43 connects with a rotation shaft 43a that has a tip end, to which a motor gear 44 is provided. The motor gear 44 engages with a spur gear 45 that has a shaft connecting a worm gear 46. The worm gear 46 engages with a helical gear 47 that has a shaft 48. The helical gear 47 is rotatable around the shaft 48. The shaft 48 includes an arm 49 that integrally rotates with the helical gear 47. The arm 49 has one end that connects with the WGV 37 via a rod 41. The helical gear 47 is surrounded with a case (not shown), to which a WGV position sensor 50 is provided for detecting the position (WGV position) of the WGV 37 by sensing rotation angle of the helical gear 47.

The motor 43 of the WGV actuator 42 is supplied with electricity, so that the motor gear 44 is rotated in one of positive direction and negative direction. The rotation of the motor gear 44 is transmitted to the helical gear 47 via the spur gear 45 and the worm gear 46. The rod 41 moves in conjunction with the rotation of the helical gear 47, thereby operating the WGV 37.

The WGV position is controlled in accordance with charging pressure in the conventional positive pressure actuator. However, in this embodiment, the WGV position is controlled using the electrically operated WGV actuator 42, so that the WGV position can be controlled regardless of the charging pressure.

As referred to FIG. 1, the turbine wheel 32 is rotated by exhaust gas supplied to the turbine wheel 32 in the turbocharger 30, so that the turning force of the turbocharger 30 is transmitted to the compressor impeller 31 via the rotation shaft 33. Thus, the compressor impeller 31 pressurizes intake air flowing through the intake pipe 11, thereby conducting supercharging operation. In this supercharging operation, the WGV 37 is operated in accordance with an operating condition of the engine 10, so that charging pressure is controlled.

Intake air supercharged using the turbocharger 30 is cooled through an intercooler 38, so that charging efficiency of intake air can be enhanced. The intake air cooled through the intercooler 38 is supplied to the downstream of the turbocharger 30.

Furthermore, an accelerator position sensor 51 is provided for detecting an accelerator position, which corresponds to an amount of operation of the accelerator pedal by a driver.

An electronic control unit (control apparatus, ECU) 60 is mainly constructed of a microcomputer having a general structure including a CPU, a ROM, a RAM, and the like. The ROM stores various programs, which are executed to conduct various control operations of the engine in accordance with an operating condition of the engine 10. Specifically, the ECU 60 inputs various detection signals from the various sensors, so that the ECU 60 calculates an amount of fuel injection, ignition timing, and the like, in accordance with the various detection signals, thereby controlling the fuel injection valve 19, the ignition apparatus, and the like.

The ECU 60 calculates a target value (target throttle position) of the position of the throttle valve 14 in accordance with the various detection signals. The ECU 60 operates the throttle actuator 15 on the basis of the target throttle position, thereby controlling the amount of intake air. Specifically, the ECU 60 calculates a target amount (target intake amount) of intake air in accordance with the accelerator position, thereby calculating the target throttle position on the basis of the target intake amount as a parameter, so that the ECU 60 controls the throttle position on the basis of the target throttle position. Furthermore, the ECU 60 controls the WGV position, simultaneously with controlling the throttle position. Thus, engine torque demanded by the driver can be produced by controlling both the throttle position and the WGV position.

Figure 3:
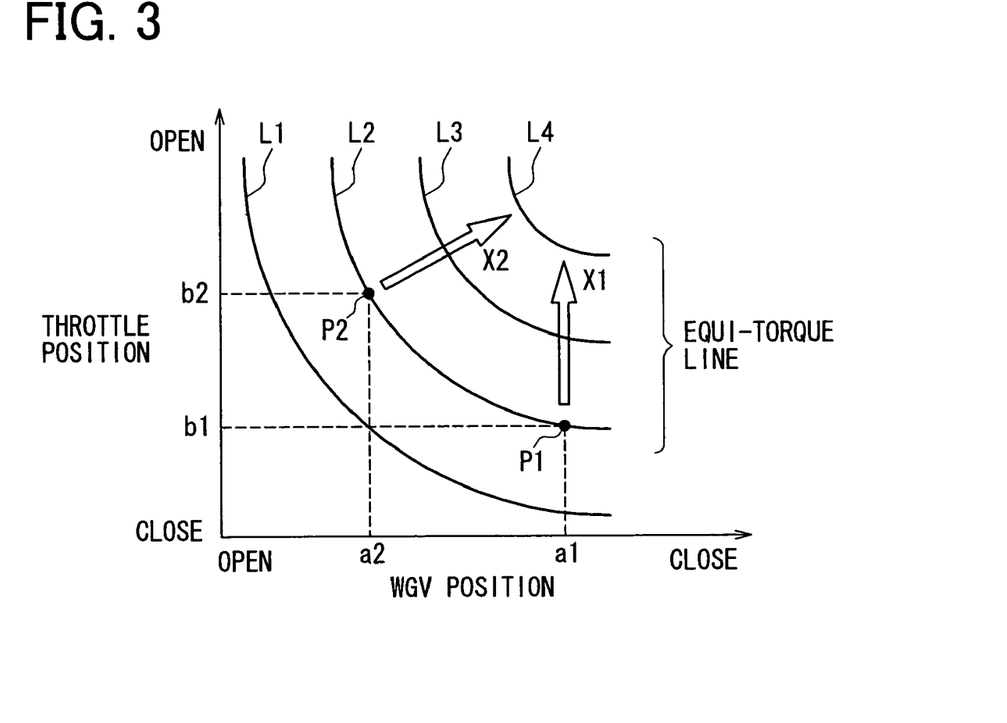
FIG. 3 is a graph showing an equi-torque characteristic of the WGV actuator, according to the embodiment.

The throttle position, the WGV position, and engine torque output by the engine 10 have a relationship shown in FIG. 3. In this relationship, equi-torque lines L1-L4 are defined as depicted in FIG. 3. The torque lines L1, L2, L3, and L4 are depicted in increasing order of engine torque from the line L1 to the line L4.

As follows, a difference between a torque control performed at the point P1 on the equi-torque line L2 and a torque control performed at the point P2 on the equi-torque line L2 is described as an example. The torque control at the point P1 corresponds to a conventional control, and the torque control at the point P2 corresponds to a control of this embodiment. At the point P1, the throttle position is b1, and the WGV position is a1, in which the WGV 37 is in a substantially full close position. At the point P2, the throttle position is b2, and the WGV position is a2.

Figure 4:
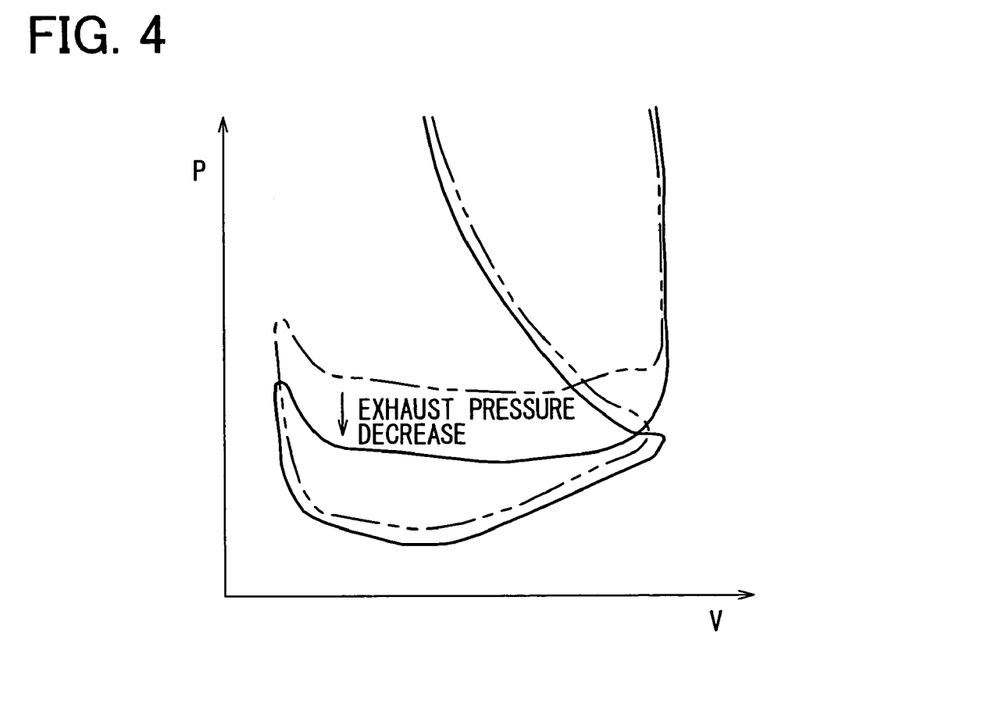
FIG. 4 is a graph showing a pressure volume diagram of the WGV actuator, according to the embodiment.

In the torque control, the throttle position b2 at the point P2 is greater than the throttle position b1 at the point P1. Therefore, as shown by the solid line in the pressure volume diagram in FIG. 4, exhaust pressure decreases compared with the chain double dashed line in the pressure volume diagram in FIG. 4, consequently, a pumping loss can be reduced. Here, the chain double dashed line in FIG. 4 depicts a characteristic in a condition where the WGV 37 is in the substantially full close position such as the point a1 in FIG. 3. The solid line in FIG. 4 depicts a characteristic in a condition where the WGV 37 is opened at a predetermined WGV position such as the point a2 in FIG. 3. Fuel efficiency can be enhanced by the torque control at the point P2.

In this embodiment, the WGV 37 is controlled in a position range excluding a predetermined WGV position range, in which the WGV is in a substantially full close position. Specifically, the WGV position is controlled in a predetermined WGV position range between 20% and 100%, preferably, in a predetermined WGV position range between 50% and 80%, in a normal operating condition of the engine 10. Here, the WGV 37 is in the full close position when the WGV position is 0%, and is in the full open position when the WGV position is 100%.

As depicted by the arrow X1 in FIG. 3, the throttle position is increased from the point P1 in an accelerating operation, so that engine torque can be increased. By contrast, as depicted by the arrow X2 in FIG. 3, in an accelerating operation on the point P2, the WGV position needs to be reduced for increasing the output torque in addition to increasing the throttle position. In this operation of this embodiment, an amount of operation of the WGV 37 becomes large compared with the conventional control. Accordingly, response (charging pressure response) of charging pressure may delay due to delay in response of the WGV actuator 42, consequently, the delay in the response of the charging pressure may exert adverse influence to response of the torque control.

Therefore, in this embodiment, the target WGV position is set in accordance with deviation (charging pressure deviation) in charging pressure to improve the charging pressure response. The charging pressure deviation is a deviation between a target value (target charging pressure) of the charging pressure and an actual value (actual charging pressure) of the charging pressure. Thus, a feedback control of the WGV position is performed such that the actual WGV position coincides with the target WGV position.

Figure 5:
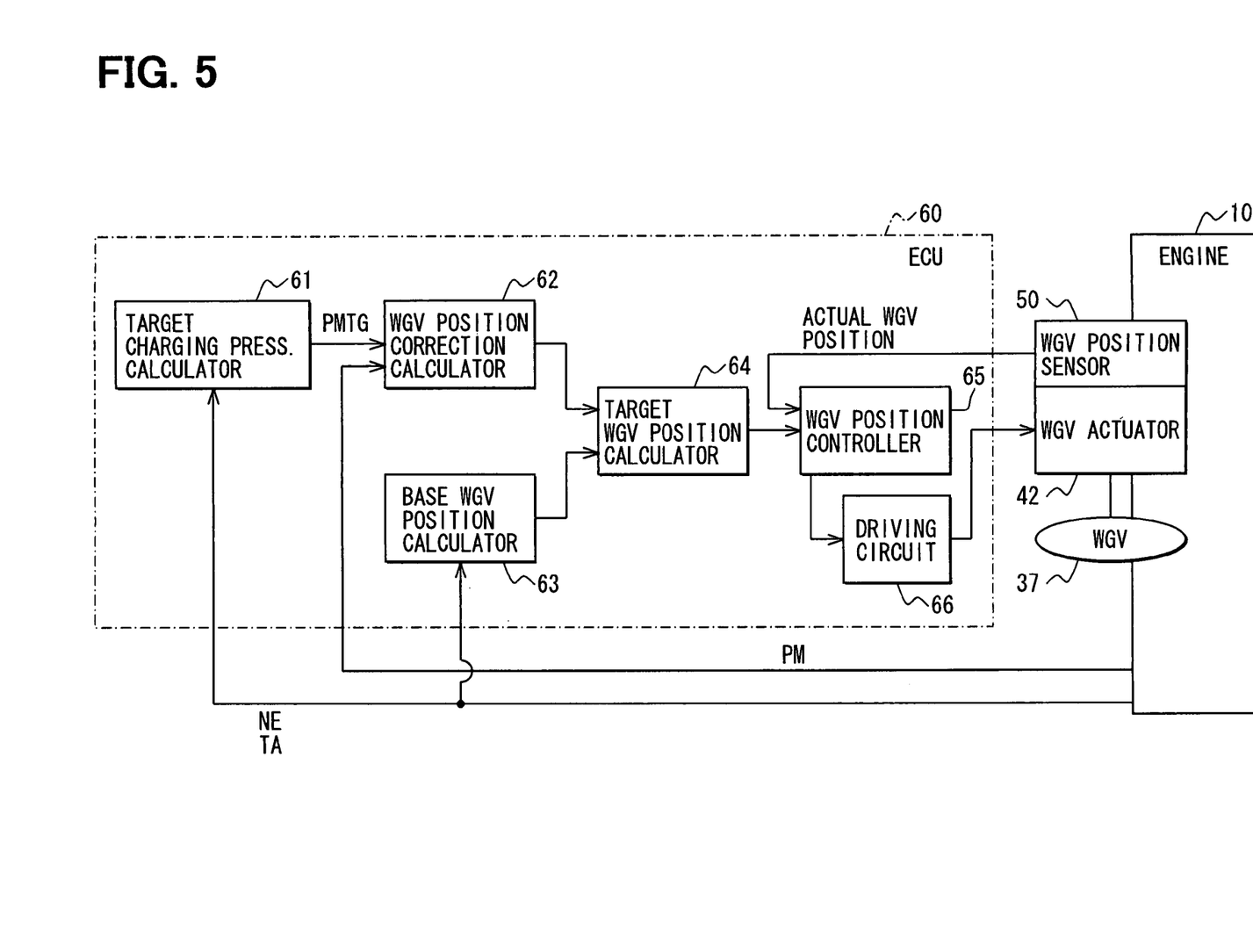
FIG. 5 is a block diagram showing a control system of an ECU of the control system for controlling charging pressure, according to the embodiment.

As follows, a control operation of the ECU 60 is described in reference to FIG. 5. The CPU of the ECU 60 has processing functions that are depicted by functional blocks. Here, intake pressure downstream of the throttle valve 14 is referred to as charging pressure. Pressure detected using the intake pressure sensor 17 is referred to as actual charging pressure PM.

Figure 6A:
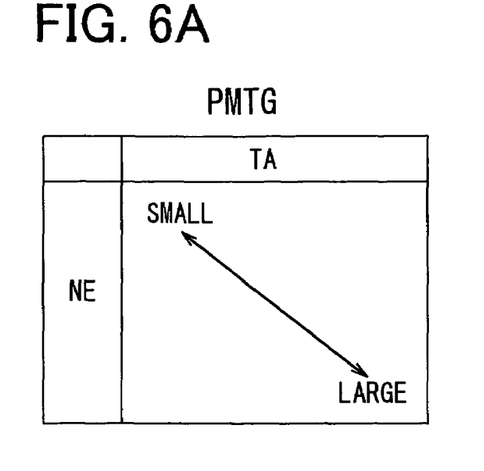
FIG. 6A is a graph showing a data map for determining target charging pressure.

A target charging pressure calculator 61 calculates the target charging pressure PMTG in accordance with the throttle position TA and rotation speed (engine rotation speed NE) of the engine 10 at the moment, as parameters, in reference to a data mat depicted in FIG. 6A, for example. In the data map in FIG. 6A, as the engine rotation speed NE becomes large, or as the throttle position TA becomes large, the target charging pressure PMTG is calculated to be large.

A WGV position correction amount calculator (WGV position correction calculator) 62 calculates a deviation (charging pressure deviation ΔPM) between the target charging pressure PMTG, which is calculated using the target charging pressure calculator 61, and the actual charging pressure PM detected using the intake pressure sensor 17. Specifically, the charging pressure deviation ΔPM is calculated by subtracting the actual charging pressure PM from the charging pressure PMTG. Subsequently, the WGV position correction calculator 62 calculates the WGV position correction amount using a feedback control algorithm. Specifically, the WGV position correction calculator 62 calculates the WGV position correction amount using a PID algorithm, for example, in accordance with the charging pressure deviation ΔPM.

Figure 6B:
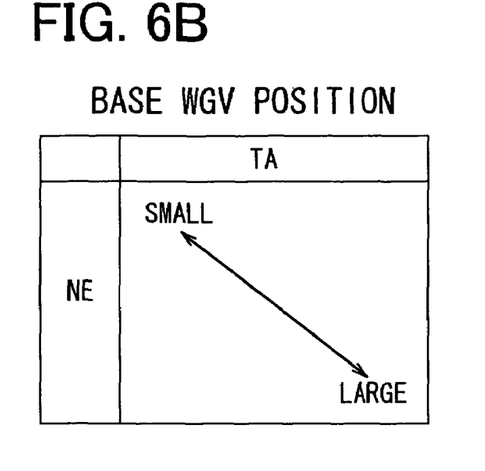
FIG. 6B is a graph showing a data map for determining base WGV position, according to the embodiment.

A base WGV position calculator 63 calculates a base WGV position in accordance with the throttle position TA and the engine rotation speed NE at the moment, as parameters, using the data map shown in FIG. 6B, for example. According to the data map depicted in FIG. 6B, as the engine rotation speed NE becomes large, or as the throttle position TA becomes large, the base WGV position is calculated to be large. In specific, the base WGV position is preferably set within a position range between 50% and 80%.

A target WGV position calculator 64 calculates the target WGV position in accordance with the base WGV position and the WGV position correction amount. More specifically, the target WGV position is calculated by adding the base WGV position to the WGV position correction amount.

A WGV position controller 65 calculates a WGV control amount in accordance with the target WGV position, which is calculated using the target WGV position calculator 64, and the actual WGV position, which is detected using the WGV position sensor 50. The WGV control amount, which is calculated using the WGV position controller 65, is output to a driving circuit 66, so that the driving circuit 66 operates the WGV actuator 42.

Figure 7:
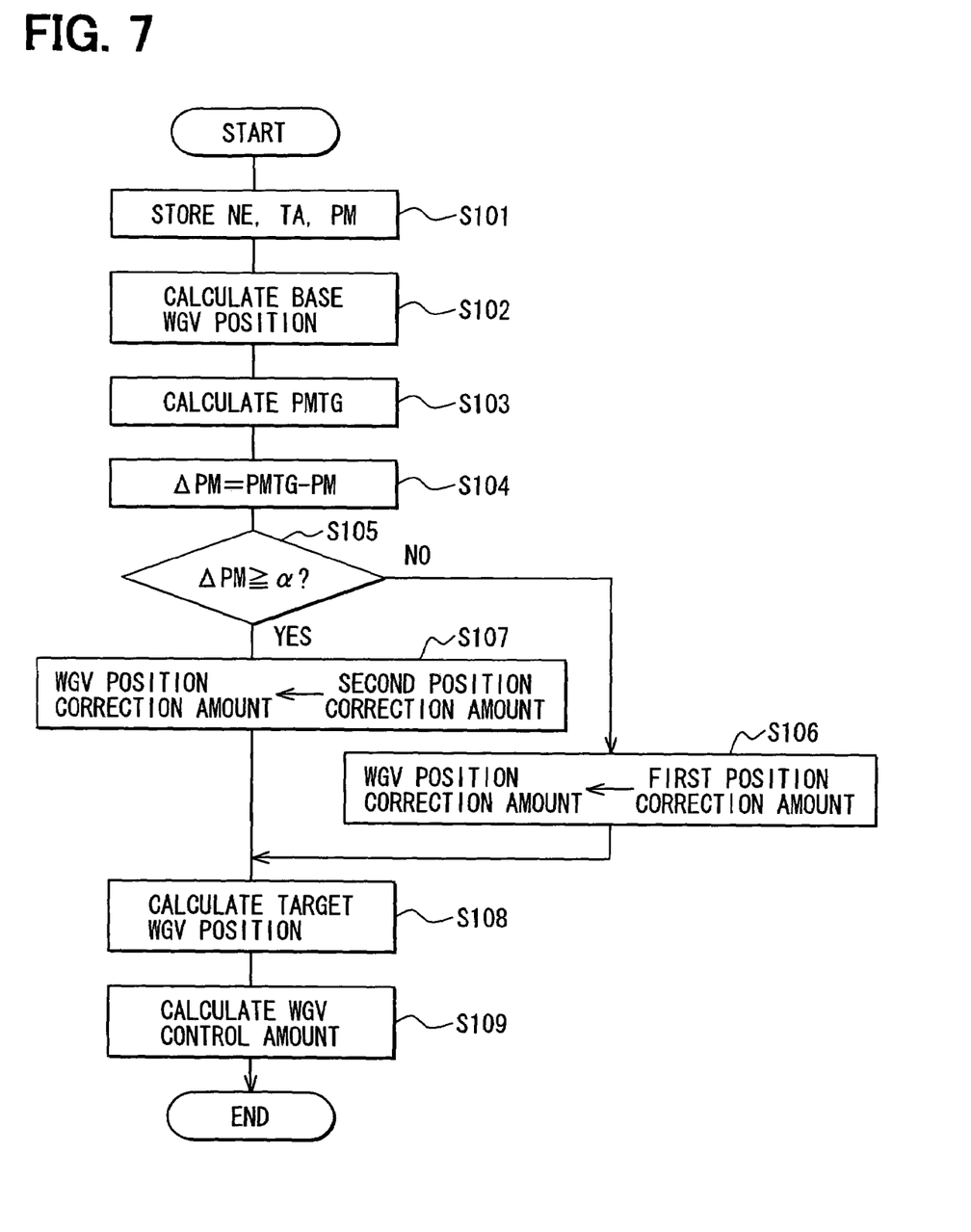
FIG. 7 is a flowchart showing a routine for controlling the WGV actuator, according to the embodiment.

As follows, a routine for controlling the WGV position is described in reference to FIG. 7. This routine shown in FIG. 7 is repeatedly executed by the ECU 60 at regular intervals.

In step S101, the ECU 60 stores parameters, which are used for executing this routine, such as the engine rotation speed NE, the throttle position TA, and the actual charging pressure PM. In step S102, the ECU 60 calculates the base WGV position in reference to a base WGV position data map such as the data map shown in FIG. 6B. In step S103, the ECU 60 calculates the target charging pressure PMTG in reference to a target charging pressure data map such as the data map shown in FIG. 6A.

In the subsequent step S104, the ECU 60 calculates the charging pressure deviation ΔPM by subtracting the actual charging pressure PM from the target charging pressure PMTG. In the subsequent step S105, the ECU 60 evaluates whether the charging pressure deviation ΔPM is equal to or greater than a predetermined threshold α. When the charging pressure deviation ΔPM is less than the threshold α, the routine proceeds to step S106, in which the ECU 60 calculates a first position correction amount, so that the ECU 60 substitutes this first position correction amount into the WGV position correction amount. When the charging pressure deviation ΔPM is equal to or greater than the threshold α, the routine proceeds to step S107, in which the ECU 60 calculates a second position correction amount, so that the ECU 60 substitutes this second position correction amount into the WGV position correction amount. Here, the ECU 60 calculates the first and second position correction amounts in accordance with the charging pressure deviation ΔPM using the feedback control algorithm such as a PID algorithm. Here, a correction amount (correction gain) of the target WGV position with respect to the charging pressure deviation ΔPM is different between the first position correction amount and the second position correction amount. Specifically, the correction gain of the target WGV position of the second position correction amount is greater than that of the first position correction amount.

As described above, the ECU 60 calculates the WGV position correction amount in one of steps S106, S107, subsequently, the routine proceeds to step S108, in which the ECU 60 calculates the target WGV position by adding the base WGV position to the WGV position correction amount. Finally, in step S109, the ECU 60 calculates the WGV control amount in accordance with the target WGV position and the actual WGV position. Thus, the motor 43 of the WGV actuator 42 is operated in accordance with the WGV control amount calculated in step S109.

Figure 8:
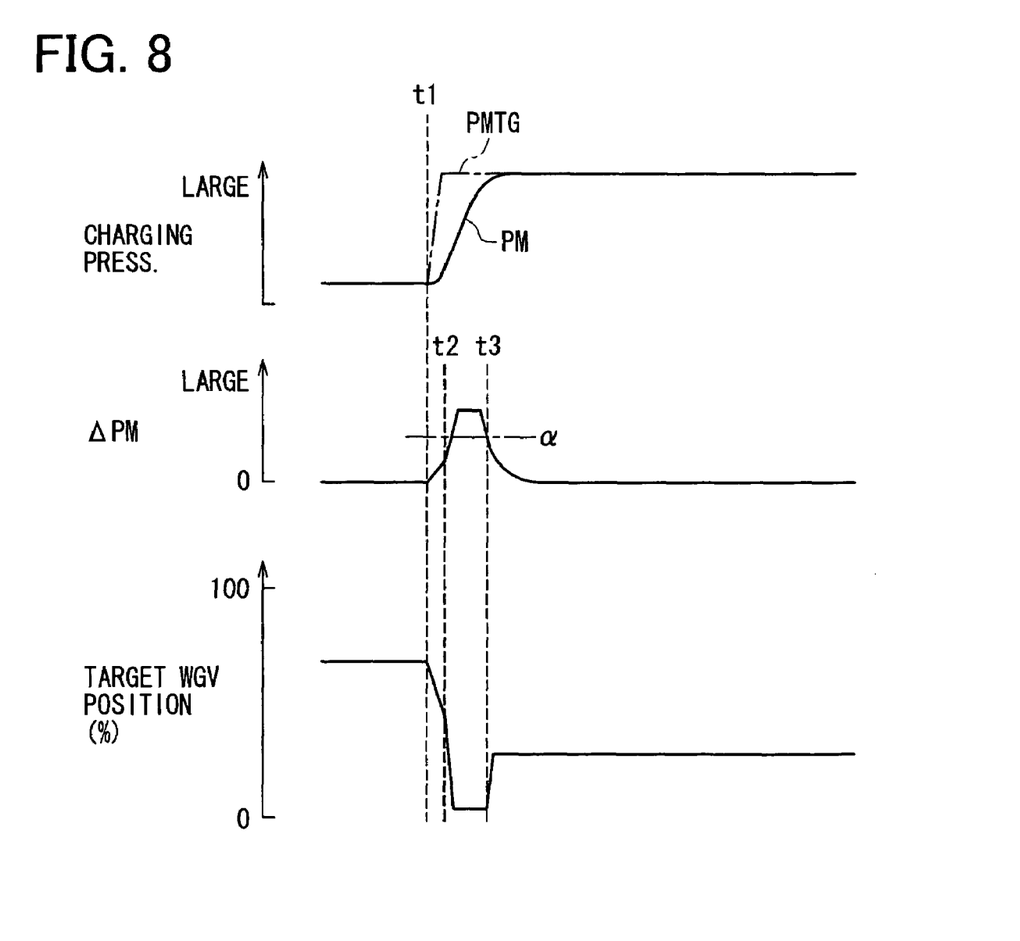
FIG. 8 is a time chart showing the control of the WGV actuator, according to the embodiment.

The time chart shown in FIG. 8 depicts a condition, in which the driver steps the accelerator pedal to accelerate the vehicle.

Previous to the timing t1, the engine 10 is in a normal operating condition, in which the vehicle is not in a transient state such as the accelerating operation. In this condition, the target WGV position is set at a predetermined position, which is out of a predetermined WGV position range, in which the WGV 37 is in a substantially full close position. In this state, the charging pressure deviation ΔPM is substantially zero, so that the base WGV position is substantially equal to the target WGV position. The ECU 60 operates the WGV actuator 42 such that the actual WGV position coincides with the target WGV position.

At the timing t1, the target charging pressure starts increasing, as the driver steps the accelerator pedal to accelerate the vehicle, so that the charging pressure deviation ΔPM starts increasing. The ECU 60 calculates the target WGV position in accordance with the charging pressure deviation ΔPM. In this condition, the ECU 60 calculates the first correction amount as the WGV position correction amount in accordance with the charging pressure deviation ΔPM, so that the ECU 60 corrects the base WGV position using the first correction amount, thereby calculating the target WGV position. Thus, the waste gate valve 37 is controlled to the closing side.

In the period between the timings t2 and t3, the charging pressure deviation ΔPM becomes greater than the threshold α, so that the ECU 60 calculates the second correction amount as the WGV position correction amount, in accordance with the charging pressure deviation ΔPM. Thus, the ECU 60 corrects the base WGV position using the second correction amount, thereby calculating the target WGV position. In this period between the timings t2 and t3, the target WGV position changes as if the target WGV position overshoots. That is, the in this period between the timings t2 and t3, the target WGV position changes at a high response. In this condition, the target WGV position is set to be substantially 0%, in this example shown in FIG. 8.

The second correction amount of the WGV position in the period between the timings t2 and t3 is greater than the first correction amount of the WGV position in the period between the timings t1 and t2, with respect to the charging pressure deviation ΔPM. Thus, convergence of the charging pressure is enhanced in a case where the charging pressure deviation ΔPM becomes large, so that the charging pressure is capable of steadily converging to the target charging pressure.

In this embodiment, the WGV 37 is operated using the electric WGV actuator 42, so that the WGV 37 can be operated regardless of the charging pressure, dissimilar to the structure, in which a waste gate valve is operated using a conventional positive pressure actuator. The WGV position is controlled in the position range excluding the substantially full close position, so that exhaust pressure can be reduced compared with the conventional control, in which a WGV is controlled in a substantially full close position. Therefore, pumping loss can be reduced by the reduction of the exhaust pressure as referred to FIG. 4, so that fuel efficiency can be enhanced. Consequently, fuel efficiency can be enhanced, while the charging pressure is properly controlled.

Furthermore, the target WGV position is set in accordance with the deviation between the actual charging pressure and the target charging pressure, so that the WGV position is controlled in accordance with the target WGV position. Thus, the charging pressure can be properly produced.

When the charging pressure deviation ΔPM is equal to or greater than the threshold α, the correction amount of the target WGV position is set to be greater than the correction amount, which is in a case where the charging pressure deviation ΔPM is less than the threshold α. Consequently, response of the charging pressure can be maintained even when an amount of operating the WGV 37 to the closing side becomes large in a transient condition such as an accelerating operation.

Summarizing the above embodiment, the internal combustion engine 10 includes the throttle valve 14, the turbocharger 30, the waste gate valve 37, and the electric actuator 42. The throttle valve 14 is provided to the intake passage 11. The throttle valve 14 is adapted to controlling the amount of intake air. The turbocharger 30 includes the exhaust turbine 32 and the intake compressor 31. The intake compressor 31 is arranged in the intake passage 11. The waste gate valve 37 is provided to the bypass passage 36, which bypasses the exhaust turbine 32. The waste gate valve 37 is adapted to controlling the opening area of the bypass passage 36. The electric actuator 42 is adapted to operating the waste gate valve 37. Torque of the internal combustion engine 10 is controlled at target torque by controlling the position TA of the throttle valve 14. The control apparatus 60 includes the setting unit 62, 63, 64 and the control unit 65. The setting unit 62, 63, 64 is adapted to setting the target position of the waste gate valve 37 in the normal operating condition of the internal combustion engine 10. The target position is out of the position range, in which the waste gate valve 37 is in the, substantially full close position. The control unit 65 controls the waste gate valve 37 such that the position of the waste gate valve 37 coincides with the target position.

Here, the WGV position correction calculator 62, the base WGV position calculator 63, and the target WGV position calculator 64 serve as the setting unit 62, 63, 64, for example. The WGV position controller 65 serves as the control unit 65, for example.

The method for controlling the internal combustion engine 10 includes the following steps. Intake air flowing into the internal combustion engine 10 is supercharged using the intake compressor 31 of the turbocharger 30. The target position of the waste gate valve 37 is set to be out of the position range, in which the waste gate valve 37 is in the substantially full close position. The electric actuator 42 is operated to control position of the waste gate valve 37 at the target position in the normal operating condition of the internal combustion engine 10, thereby controlling the amount of exhaust gas bypassing the exhaust turbine 32 of the turbocharger 30.

The structure and operation are not limited to the above embodiment.

In the above embodiment, one of the first and second position correction amounts, which are different in correction gain from each other, is selectively calculated. However, for example, the WGV position correction amount, which corresponds to the first position correction amount, may be calculated with a constant correction amount (correction gain), regardless of the charging pressure deviation $\Delta PM$.

In addition, the throttle position correction amount may be calculated in accordance with the charging pressure deviation $\Delta PM$, when the charging pressure deviation $\Delta PM$ is equal to or greater than a threshold. In this operation, the target throttle position and a control amount of the throttle valve 14 may be corrected using this throttle position correction amount to control the throttle position.

Figure 9:
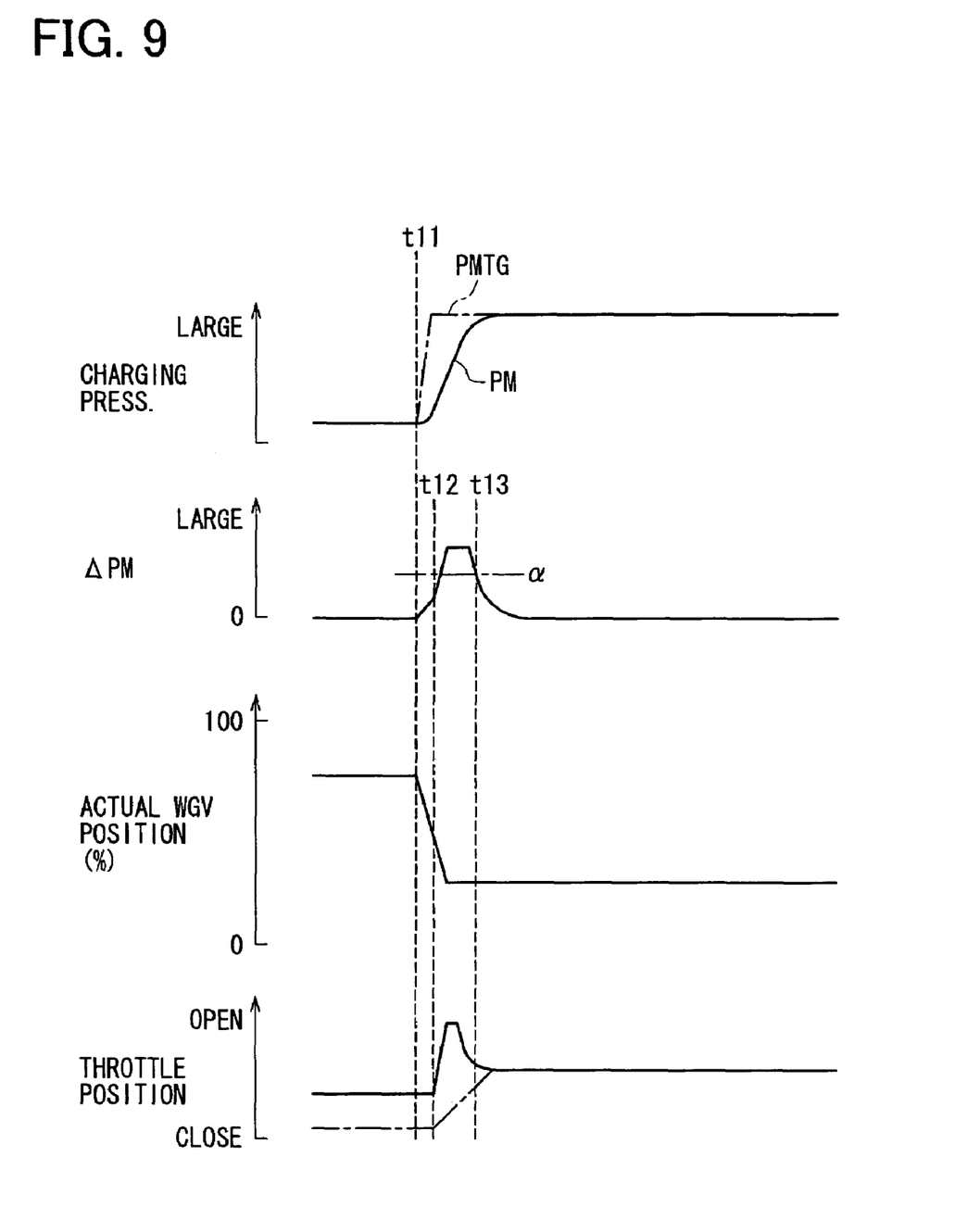
FIG. 9 is a time chart showing the control of the WGV actuator, according to a variation of the embodiment.

Specifically, as shown in FIG. 9, at the timing t11, the target charging pressure starts increasing as the driver steps the accelerator pedal, so that the charging pressure deviation $\Delta PM$ starts increasing. The ECU 60 calculates the target WGV position in accordance with the charging pressure deviation $\Delta PM$. The ECU 60 calculates the WGV position correction amount on the basis of the charging pressure deviation $\Delta PM$, so that the ECU 60 corrects the base WGV position using the WGV position correction amount, thereby calculating the target WGV position. Thus, the ECU 60 operates the WGV 37 to the closing side.

In the period between the timings t12 and the t13, the charging pressure deviation $\Delta PM$ becomes equal to or greater than the threshold $\alpha$. In this condition, the ECU 60 corrects the throttle position correction amount in accordance with the charging pressure deviation $\Delta PM$, so that the ECU 60 controls the throttle valve 14 in accordance with the throttle position correction amount.

In this period between the timings t12 and t13, the throttle position changes as if the throttle position overshoots. As described above, the ECU 60 controls the WGV position and the throttle position, so that convergence of the charging pressure is enhanced in a case where the charging pressure deviation $\Delta PM$ becomes large, so that the charging pressure is capable of steadily converging to the target charging pressure.

The ECU 60 may gradually change the correction amount (correction gain) in accordance with the charging pressure deviation $\Delta PM$, instead of substituting one of the first and second position correction amount into the WGV position correction amount in accordance with the comparison result between the charging pressure deviation $\Delta PM$ and the threshold $\alpha$. Specifically, the ECU 60 may gradually change the correction amount (correction gain) in accordance with the charging pressure deviation $\Delta PM$ to calculate the WGV position correction amount, as appropriate.

The ECU 60 may control the WGV 37 in one of a substantially full close position and a substantially full open position for a predetermined period when the charging pressure deviation $\Delta PM$ is equal to or greater than a threshold. In this operation, the ECU 60 may set the WGV 37 in a substantially full close position such that the ECU 60 sets the WGV position at substantially 0% when the output power of the engine 10 increases. By contrast, the ECU 60 may set the WGV 37 in a substantially full open position such that the ECU 60 sets the WGV position at substantially 100% when the output power of the engine 10 decreases.

In the above embodiment, the correction amount of the target WGV position is increased when the charging pressure deviation $\Delta PM$ becomes large. However, the ECU 60 may increase the correction amount of the target WGV position to enhance response of the charging pressure when one of a variation in the accelerator position operated by the driver and a variation in the throttle position corresponding to the variation in the accelerator position More specifically, when one of the variation in the accelerator position operated by the driver and the variation in the throttle position is greater than a threshold, the ECU 60 may set the correction amount of the target WGV position to be greater than the correction amount, which is used in a case where the variation is less than the threshold. Thus, the ECU 60 controls the WGV position such that the ECU 60 operates the WGV 37 at high response.

Alternatively, the ECU 60 may control the WGV 37 on one of a substantially full open position and a substantially full close position for a predetermined period, when one of the variation in the accelerator position operated by the driver and the variation in the throttle position is greater than the threshold.

The target WGV position may be variably set in accordance with the operating condition of the engine 10. In this operation, even when the operating condition of the engine 10 changes, the WGV 37 can be properly controlled corresponding to the change in the operating condition of the engine 10.

When one of the variation in the accelerator position operated by the driver and the variation in the throttle position is greater than a threshold, the ECU 60 may set WGV position correction amount to be greater than the correction amount, which is used in a case where the variation is less than the threshold.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiment without departing from the spirit of the present invention.

What is claimed is:

1. A method for controlling an internal combustion engine, the method comprising:

supercharging intake air flowing into the internal combustion engine using an intake compressor of a turbocharger;

setting a target position of a waste gate valve to be not in a substantially 0% open, full close position;

operating an electric actuator to control a position of the waste gate valve at the target position in a non-transient operating condition of the internal combustion engine, thereby controlling an amount of exhaust gas bypassing an exhaust turbine of the turbocharger;

detecting actual charging pressure;
setting target charging pressure in accordance with an operating condition for the internal combustion engine;
setting the target position of the waste gate valve in accordance with a charging pressure deviation between the target charging pressure and the actual charging pressure;
providing a first response to control the waste gate valve when the charging pressure deviation is equal to or greater than a threshold; and
providing a second response to control the waste gate valve when the charging pressure deviation is less than a threshold,
wherein the first response moves the waste gate valve position more rapidly than does the second response.

2. The method according to claim 1,
wherein the target position is at least 20% of maximum waste gate valve opening.

3. The method according to claim 1, wherein the target position is set in accordance with an operating condition of the internal combustion engine.

4. The method according to claim 3, wherein the operating condition of the internal combustion engine is based on at least one of: (a) engine rotation speed, (b) the position of the throttle valve, and (c) actual charging pressure.

5. The method according to claim 1, further comprising:
setting a base value of the target position in accordance with an operating condition of the internal combustion engine;
setting the correction amount at a first correction amount in accordance with the charging pressure deviation when the charging pressure deviation is equal to or greater than the threshold;
setting the correction amount at a second correction amount in accordance with the charging pressure deviation when the charging pressure deviation is less than the threshold; and
correcting the base value of the target position of the waste gate valve in accordance with one of: (a) the first correction amount and (b) the second correction amount,
wherein the first correction amount is greater than the second correction amount.

6. The method according to claim 1, further comprising:
controlling the waste gate valve in one of: (a) substantially full open position and (b) a substantially full closed position for a predetermined period, regardless of the target position, when the charging pressure deviation is equal to or greater than the threshold.

7. The method according to claim 1, further comprising:
providing a first response to control the waste gate valve when one of: (a) a variation in an accelerator position and (b) a variation in the position of the throttle valve corresponding to the accelerator position is equal to or greater than a threshold; and
providing a second response to the control of the waste gate valve when said one of the variations is less than the threshold,
wherein the first response moves the waste gate valve position more rapidly than does the second response.

8. The method according to claim 1, further comprising:
setting a base value of the target position in accordance with an operating condition of the internal combustion engine;
setting the correction amount at a first correction amount in accordance with the charging pressure deviation when one of: (a) a variation in an accelerator position and (b) a variation in the position of the throttle valve corresponding to the accelerator position is equal to or greater than a threshold;
setting the correction amount at a second correction amount in accordance with the charging pressure deviation when said one of the variations is less than the threshold; and
correcting the base value of the target position in accordance with one of: (i) first correction amount and (ii) the second correction amount,
wherein the first correction amount is greater than the second correction amount.

9. The method according to claim 1, wherein the control unit controls the waste gate valve in one of: (a) a substantially full open position and (b) a substantially fully closed position for a predetermined period, regardless of the target position, when one of: (i) a variation in an accelerator position and (ii) a variation in the position of the throttle valve corresponding to the accelerator position is equal to or greater than the threshold.

10. The method according to claim 1, further comprising:
controlling an amount of intake air flowing into the internal combustion engine using a throttle valve; and
controlling a position of the throttle valve in accordance with the charging pressure deviation when the charging pressure deviation is equal to or greater than a threshold.

11. The method according to claim 1, wherein the target position is for a non-accelerating operating condition.

12. A control apparatus for an internal combustion engine, the internal combustion engine comprising:
a throttle valve disposed in an intake passage to control an amount of intake air;
a turbocharger having an exhaust turbine and an intake compressor, the intake compressor also being disposed in the intake passage;
a waste gate valve disposed in a bypass passage which bypasses the exhaust turbine, the waste gate valve controlling exhaust gas flow in the bypass passage between substantially 0% and 100% of its maximum opening; and
an electric actuator coupled to operate the waste gate valve,
wherein torque of the internal combustion engine is controlled by controlling a position of the throttle valve;
the control apparatus comprising:
a setting unit which sets a target position for the waste gate valve at a position that is not a substantially 0% opening;
a control unit that controls the waste gate valve position to move toward the target position:
a target pressure setting unit which sets a target charging pressure in accordance with an operating condition of the internal combustion engine; and
a detection unit that detects actual charging pressure,
wherein the control unit controls the waste gate valve in accordance with a deviation in charging pressure between the target charging pressure and the actual charging pressure,
wherein the control unit provides a first response to control the waste gate valve when the deviation of charging pressure is equal to or greater than a threshold,
the control unit provides a second response to control the waste gate valve when the deviation of charging pressure is less than a threshold, and
the first response moves the waste gate valve position more rapidly than does the second response.

13. The control apparatus according to claim 12, wherein:
the target position is at least 20% of maximum waste gate valve opening.

14. The control apparatus according to claim 12, wherein the setting unit sets the target position in accordance with an operating condition of the internal combustion engine.

15. The control apparatus according to claim 12, wherein:
the setting unit includes a base setting unit and a correction amount calculating unit, the base setting unit sets a base value of the target position in accordance with an operating condition of the internal combustion engine, and the correction amount calculating unit calculates a correction amount in accordance with the deviation of charging pressure, the base value of the target position being corrected in accordance with the correction amount, the correction amount calculating unit setting the correction amount at a first correction amount when the deviation of charging pressure is equal to or greater than a threshold, the correction amount calculating unit setting the correction amount at a second correction amount when the deviation of charging pressure deviation is less than the threshold, and the first correction amount is greater than the second correction amount.

16. The control apparatus according to claim 12, wherein:
the control unit controls the waste gate valve in one of (a) a substantially full 100% open position and (b) a substantially full closed 0% open position for a predetermined period, regardless of the target position, when the deviation of charging pressure is equal to or greater than the threshold.

17. The control apparatus according to claim 12, wherein:
the control unit provides a first response to control the waste gate valve when one of (a) a variation in an accelerator position and (b) a variation in the position of the throttle valve corresponding to the accelerator position is equal to or greater than a threshold, the control unit provides a second response to control the waste gate valve when said one of the variations is less than the threshold, and the first response moves the waste gate valve position more rapidly than does the second response.

18. The control apparatus according to claim 12, wherein:
the setting unit includes a base setting unit and a correction amount calculating unit, the base setting unit sets a base value of the target position in accordance with an operating condition of the internal combustion engine, the correction amount calculating unit calculates a correction amount in accordance with the deviation of charging pressure, the base value of the target position being corrected in accordance with the correction amount, the correction amount calculating unit sets the correction amount at a first correction amount when one of (a) a variation in an accelerator position and (b) a variation in the position of the throttle valve corresponding to the accelerator position is equal to or greater than a threshold, the correction amount calculating unit sets the correction amount at a second correction amount when said one of the variations is less than the threshold, and the first correction amount is greater than the second correction amount.

19. The control apparatus according to claim 12, wherein:
the control unit controls the waste gate valve in one of (a) a substantially 100% full open position and (b) a substantially fully closed 0% open position for a predetermined period, regardless of the target position, when one of (i) a variation in an accelerator position and (ii) a variation in the position of the throttle valve corresponding to the accelerator position is equal to or greater than the threshold.

20. The control apparatus according to claim 12, further comprising:
a unit that is adapted to control the position of the throttle valve in accordance with the deviation of charging pressure, when the deviation is equal to or greater than a threshold.

21. The control apparatus according to claim 12, wherein the target position is for a non-accelerating operating condition.

22. The control apparatus according to claim 14, wherein the target position is for an operating condition of the internal combustion engine based on at least one of: (a) engine rotation speed, (b) the position of the throttle valve, and (c) actual charging pressure.

* * * * *